United States Patent [19]

Masreliez

[11] Patent Number: 5,104,225
[45] Date of Patent: Apr. 14, 1992

[54] POSITION DETECTOR AND METHOD OF MEASURING POSITION
[75] Inventor: Karl G. Masreliez, Bellevue, Wash.
[73] Assignee: Mitutoyo Corporation, Tokyo, Japan
[21] Appl. No.: 646,080
[22] Filed: Jan. 25, 1991
[51] Int. Cl.$^5$ .................................... G01B 9/02
[52] U.S. Cl. .................................... 356/356; 356/354; 356/351; 250/237 G
[58] Field of Search ................. 356/356, 354, 351; 250/237 G, 231.16; 350/115

[56] References Cited

U.S. PATENT DOCUMENTS 4,629,886 12/1986 Akiyama et al. ............... 250/237 G Primary Examiner—Samuel Turner
Assistant Examiner—Richard E. Kurtz
Attorney, Agent, or Firm—Seed and Berry

[57] ABSTRACT

According to the principles of the invention, an improved system and method of accurately measuring the position of an object to high resolution are provided. A read-head is positioned adjacent a grating. The read head emits light onto the grating. The light is diffracted into two light beams by the grating. The light beams are reflected back towards the grating, to be diffracted a second time and combined into a single beam. The polarization of the respective light beams is modified before being diffracted the second time. The polarization component of the beam parallel to the diffraction grating grooves is rotated perpendicular to the diffraction grating grooves and the component of the beam perpendicular to the diffraction grating grooves to be rotated parallel to the diffraction grating grooves. The effects of the diffraction on perpendicular or parallel polarized light are canceled because the same light impinges at two different polarizations, each the opposite of the other, prior to being combined into a single beam.

28 Claims, 11 Drawing Sheets

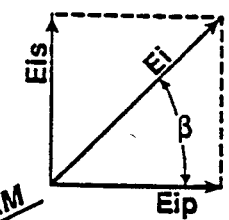
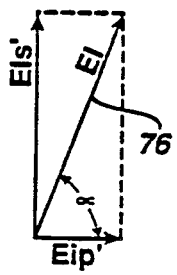
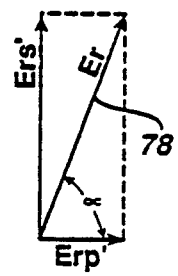
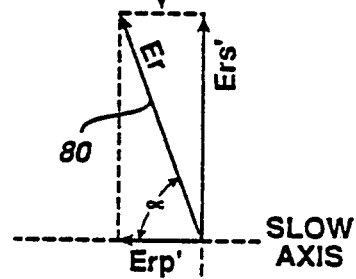
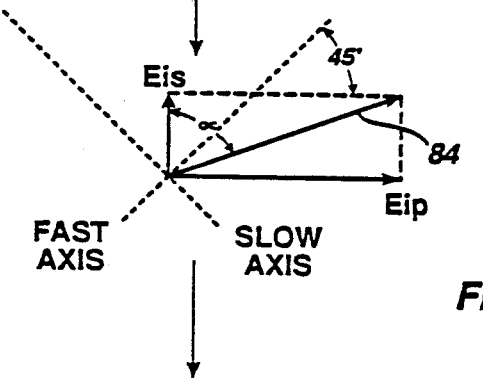
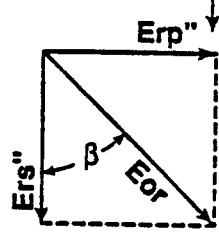
*Figure 6a*
*Figure 6b*
*Figure 6c*
*Figure 6d*
*Figure 6e*

POSITION DETECTOR AND METHOD OF MEASURING POSITION

DESCRIPTION

1. Technical Field

This invention relates to position detectors using a diffraction grating to sense displacement, and more particularly, to a method and system for increasing the accuracy and resolution in such a position detector.

2. Background of the Invention

One prior art system for sensing the position of an object to an accuracy below the micrometer range utilizes laser diode light diffracted from a reflective diffraction grating. Light impinging on the grating is diffracted and reflected into two diffraction beams. Each diffracted beam is reflected back to the grating, diffracted a second time, and combined into a single beam. The beams are polarized at right angles to each other before the second diffraction to prevent them from interfering in the combined beam. The average intensity of the combined signal is sensed in a photodetector, providing a DC level component. The combined beam then passes through a polarizer which selects components of each beam for interfering with each other.

The phase difference between the two beams is based on the position of the diffraction grating, so that as the diffraction grating moves, the phase relationship of the two beams changes, causing them to constructively or destructively interfere. For first order diffractions, the peak-to-peak period of the interfering beams is p/4, where p is the pitch of the diffraction grating. Thus, for diffraction gratings having a pitch of 1 micron, a peak in the interfering beams occurs each time the scale moves ¼ of a micron, or 250 nm.

Scale position within 250 nm can be measured with some accuracy by sensing the peaks of the output signal as the scale is laterally displaced. For measuring scale position more accurate than 250 nm, scale displacement between peaks must be estimated by interpolations. Presently, the prior art attempts to establish a position to within 10 nm, but is not able to measure any position with more accuracy than this. Further, because of numerous possible problems in the prior art devices, as will be explained herein, true accuracy may not be within 10 nm, but the user is not aware of the position being inaccurate. If the user wishes to ensure accurate measurements within 10 nm, a laser interferometer is required. The laser interferometer is much more expensive, complex, and delicate than a diode light source diffraction grating. A diode-based position detector which accurately measures a position to within 10 nm or less would be useful to replace current expensive systems requiring the use of a laser interferometer.

SUMMARY OF THE INVENTION

According to the principles of the invention, an improved system and method of accurately measuring the position of an object to high resolution are provided. A read head is positioned adjacent to a grating. The read head emits light onto the grating. The light is diffracted into two light beams by the grating. The light beams are reflected back towards the grating, to be diffracted a second time and combined into a single beam. The polarization of the respective light beams is modified before being diffracted the second time. The polarization component of the beam parallel to the diffraction grating grooves is rotated perpendicular to the diffraction grating grooves and the component of the beam perpendicular to the diffraction grating grooves is rotated parallel to the diffraction grating grooves. The effects of the different diffraction efficiencies of perpendicular and parallel polarized light, respectively, are canceled because the same light impinges at two different polarizations, each the opposite of the other, prior to being combined into a single beam.

In one embodiment, polarizers screen out light in a selected polarization angle so that the beam is polarized either perpendicular or parallel to the grating grooves. For this embodiment, the polarization of the beams exiting the polarizers is rotated by 90°, to reverse the polarization direction, making the parallel polarized beam perpendicular and the perpendicular polarized beam parallel to the grating grooves.

In another embodiment, the reflected light does not pass through polarizers, and the beams pass through polarization mirroring stages to mirror their polarization about a selected axis. In this embodiment, one of the beams is mirrored about the perpendicular component to reverse the direction of the parallel component and then mirrored 45° to the perpendicular to provide a wave having the parallel and perpendicular components switched. The other beam is mirrored 45° to the parallel to provide the polarized, rotated light beam.

The location at which the reflected light beams strike the diffraction plate relative to the first light beam is selected to provide a longer scale run in one embodiment. For example, the two locations of light impinging upon the diffraction grating are aligned perpendicular to the direction of travel of the grating so that the sensing pattern takes up less area and the same length of scale can be used to measure greater displacements.

In a further alternative embodiment, the light impinges upon the diffraction grating at an acute angle to the surface to enable reading scales with a smaller grating pitch than possible in the prior art. The angle is preferably the same as the positive diffraction angle.

The diffraction grating may be a simple grating having all grating grooves parallel to each other and perpendicular to the direction of movement to provide position sensing along a single axis. Alternatively, the grating may be an X-Y grid to permit position sensing in the X and Y axes. The grating can be either a transmissive grating or a reflective grating.

This invention thus provides the advantage that linear displacements and exact positions can be accurately measured to better than 10 nm using a relatively inexpensive light source and grating because, according to the invention, the polarizing effects of the scale grating are neutralized. A second advantage over the prior art is that the intensity of the light at a second reflection from a diffraction grating is significantly greater than such a reflection in a prior art device, thus providing a device which is also less susceptible to noise. Having the incident beam from the light source at an angle with respect to the diffraction grating permits use of a diffraction grating having a pitch which is shorter than the wavelength of the light, an advantage not possible with the prior art device. Further advantages to having the incident beam from the light source at an angle with respect to the diffraction grating are that back-reflected light into the input beam is avoided and harmful effects of multiple reflections within the read head are eliminated.

BRIEF DESCRIPTION OF THE DRAWINGS

FIG. 2b is a top side view of FIG. 2a.

FIGS. 6a–6e are graphic illustrations of the polarization components and vectors of the diffracted beams at various positions in the embodiment of FIG. 5.

FIG. 7b is a side elevation of FIG. 7a.

DETAILED DESCRIPTION OF THE INVENTION

Figure 1:
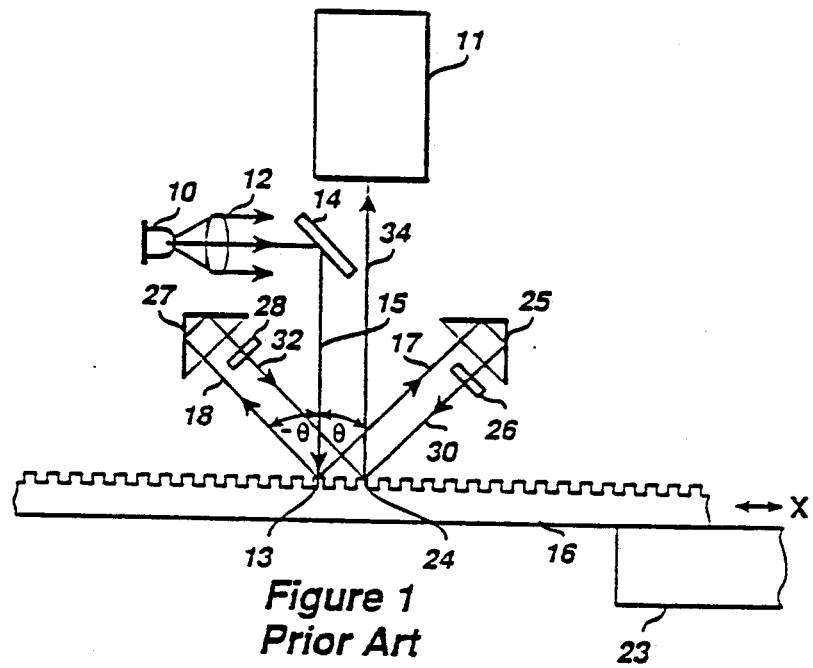
FIG. 1 is a side elevation of a prior art position detection device

FIG. 1 illustrates a position detector according to the prior art, as illustrated in laid open Japanese patent publication no. 1-26005. In the prior art position detector, a monochromatic light source 10, such as a laser diode, together with a collimator 12, projects a collimated beam to a mirror 14 and upon a diffraction grating scale 16, normal to the surface of the scale. The light is diffracted by the diffraction grating 16 into positive and negative orders 17 and 18. The beams are diffracted at an angle of $\theta$ and $-\theta$, respectively, with respect to the normal to the surface.

Figure 2A:
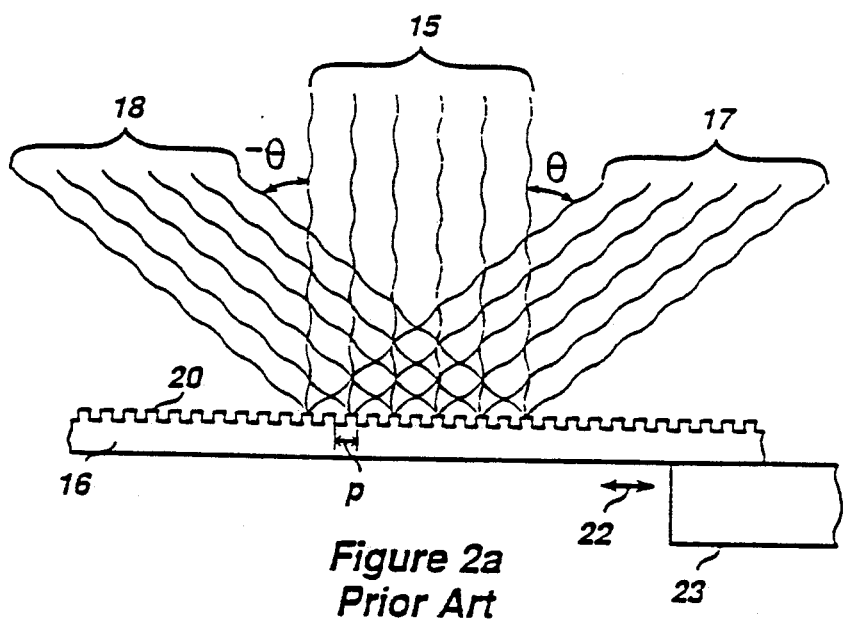
FIG. 2a is an enlarged side elevation of the diffraction grating and light being diffracted thereby

FIG. 2a is an enlarged side view of the diffraction grating scale 16 of FIG. 1 illustrating the diffraction of the first order light beams. The diffraction member 16 is coupled to an object 23 which undergoes lateral displacement along the direction indicated by arrow 22, the movement being perpendicular to the individual grating grooves 20. Light beam 15 impinges on the diffraction grating 16 normal to the surface. The positive angle diffraction beam 17 is diffracted from the grating at an angle $\theta$, relative to the surface normal of the diffraction grating 16. The negative angle diffraction beam 18 is diffracted from the grating 16 at an angle $-\theta$, having an equal value to $\theta$, but opposite in sign.

Figure 2B:
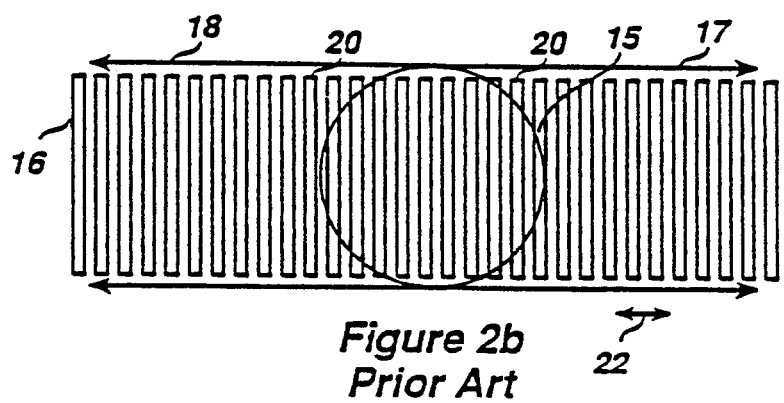

As illustrated in FIG. 2b, the diffraction grating grooves 20 extend parallel to each other. The pitch p of one diffraction grating groove 20 is from a point on one grating groove 20 to the same point on an adjacent grating groove 20. The pitch p in a diffraction grating according to the prior art might be in the range of 1.6 to 1.0 microns, one micron being $10^{-6}$ m. The width of the beams 15, 17, and 18 is generally in the range of several millimeters, and thus the beams will generally cover many thousands of the individual grating grooves 20.

The position of the diffraction grating scale 16, and thus of an object 23 coupled to the scale 16, is determined in the prior art system of FIG. 1 as follows. The light beam 15 first strikes the surface at point 13, and is diffracted into two beams, as just explained. The positive angle diffraction beam 17 is reflected by retro-reflector 25 back to the surface at a selected point 24 to impinge upon the diffraction grating scale 16. Similarly, the negative angle beam 18 is reflected by retro-reflector 27 to impinge upon the same spot 24 of the diffraction grating scale 16. Prior to the diffraction beams 17 and 18 striking the diffraction grating scale 16 a second time, the beams pass through respective linear polarizers 26 and 28, which screen the light so that it is polarized in a selected plane. The polarizers 26 and 28 are oriented with their polarization axes perpendicular to each other so that the resultant respective beams 30 and 32 are polarized at right angles to each other. The beams strike at the same point 24 on the scale, and, upon being diffracted a second time, form a combined beam 34.

It is well known that two rays polarized at right angles to each other do not interfere when combined into a single beam. Even though the combined beam 34 is a combination of two beams of the same wavelength, they are not interfering with each other because their polarizations are at right angles. The beam 34 is sensed by photodetector system 11 in the following manner.

Figure 2C:
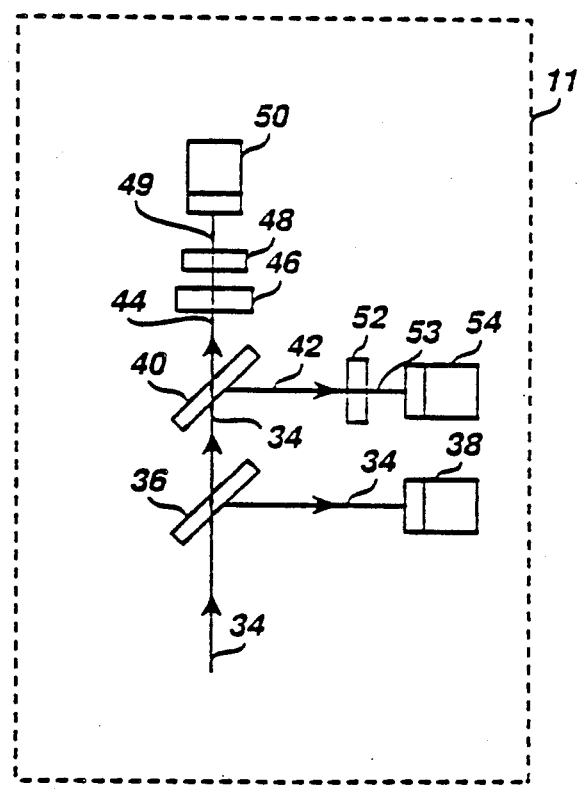
FIG. 2c is a side elevation of a prior art sensing system of a read head from FIG. 1.

As shown in FIG. 2c, the beam 34 enters a photodetector system 11 having various beam splitters and photodetectors. A beam splitter 36 diverts a portion of the output beam 34 to photodetector 38, which detects the average intensity of the combined output beam 34. Beam splitter 40 splits the beam 34 into two components 42 and 44. One of the components, 44, passes through a $\lambda/4$ delay plate 46 and then passes through a polarizer 48, after which its intensity is detected by photodetector 50. The other portion of the beam 42 passes through polarizer 52 and its intensity is sensed by photodetector 54. The respective polarizers 48 and 52 are oriented at the same angle, generally at 45° from the polarization angle of each of the two portions of the combined beam 34. The output of each of the polarizers 48 and 52 is a combined beam having the two components of the diffracted beams polarized in the same plane.

The two rays 30 and 32 do not interfere while at right angles, but do interfere when brought into the same plane of polarization. The respective polarizers 48 and 52 thus cause the components of the beam 34 to interfere with each other. The interfering beams may constructively interfere or destructively interfere, depending on the relative phase of the beams. As is known in the prior 15 art, the relative phase difference between the positive angle diffraction beam 17 and the negative angle diffraction beam 18 varies with the position of the diffraction grating 16. The phase difference P is related to the amount of scale displacement x according to the following equation:

$$P = 4 * n (x/p) * (2*\pi) \tag{1}$$

where n is the order of diffraction, p is the scale pitch, P is the relative phase difference of the two beams, and x is the displacement of the scale.

Figure 3A:
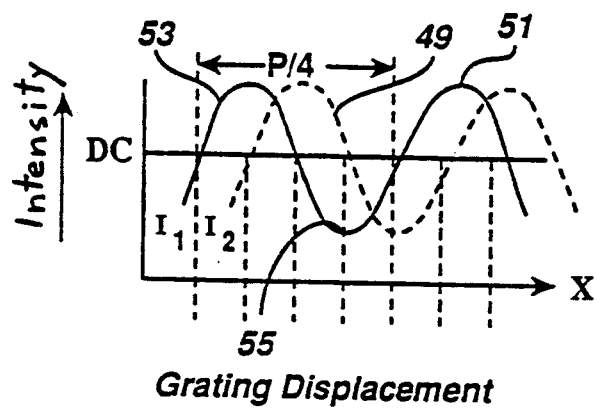
FIG. 3a is a plot of light intensity of two light signals versus grating position, according to the prior art.

As illustrated in FIG. 3a, the intensity of the light beam 53 varies according to a sine wave pattern with displacement of the diffraction scale 16 along the X axis as the relative phase of the two beams causes either destructive or constructive interference For constructive interference, the intensity of the light beam has a maxima at 51, and for destructive interference, it has a minima at 55. For first-order diffractions (n=1) the period of the sine wave is p/4, as illustrated in FIG. 3a. Similarly, the signal 49 varies as the diffraction grating scale 16 is displaced. The light intensities of waves 49 and 53 offset at 90° with respect to each other because the λ/4 delay plate 46 delays light beam 49 to place it 90° lagging behind wave 53, which produces two quadrature signals for providing an indication of the direction of movement of the diffraction member 16. The intensity of the quadrature signals 53 ($I_1$) and 49 ($I_2$) is given by the following equations:

$$I_1 = DC + A * cos(P) \tag{2}$$

and $$I_2 = DC + A * sin(P) \tag{3}$$

where $I_1$ and $I_2$ is the respective intensity of signals 53 and 49, DC is the average intensity level, A is the amplitude of the sinusoidal AC component, and P is the phase difference between the two component beams A third signal, $I_3$ is also obtained from detector 38, which is proportional to the average intensity level according to the equation:

$$I_3 = K * DC \tag{4}$$

where DC is the average intensity level and K is a constant factor. The photodetector 38 senses the average intensity prior to the polarization of the two waves being aligned by polarizers 48 and 52 and thus is (in the ideal case) the average intensity of the two component beams when they are not interfering.

The light beams 49, 53, and 34 are converted to electrical signals by respective photodetectors 50, 54, and 38 as described, amplified and fed to a counter which computes and displays the scale displacement x in a manner well known in the prior art. The system of FIGS. 1–3a as just described is based on known prior art devices. However, these systems have significant problems in providing accurate measurements of displacements less than 0.25 microns, for reasons which will now be described.

In order to obtain higher accuracy than the period of the output signals $I_1$ and $I_2$, one has to estimate the phase P within the period by use of interpolation. For achieving best interpolation accuracy the amplitude, A, of the quadrature signals should be kept constant. This can be done by requiring that the scale must have the same diffraction efficiency over the scale area, but this is difficult to achieve.

A more feasible way of dealing with this problem is to apply an automatic gain control to the quadrature signals by sensing the amplitude A, and adjust either the source output power or the signal amplitude at the output amplifiers so that A is kept constant. However, the problem is to sense the amplitude A.

Prior art (e.g., U.S. Pat. No. 4,629,886) uses the method of squaring the signals $I_1$ and $I_2$ (after subtracting the average signal level DC, available from signal $I_3$), adding the squared signals together, and taking the square root of the sum, thereby obtaining the amplitude A. However, this is a method which requires complex and expensive analogue circuitry.

Prior art (e.g., U.S. Pat. No. 4,629,886) also uses signal $I_3$, proportional to the average signal level DC, as a measure of the amplitude A. Due to the polarization effect of the scale, this technique does not provide an accurate measurement.

Prior art (e.g., U.S. Pat. No. 4,676,645 and Japanese laid open application no. 62-200219) discloses a device using two separate beams striking the scale. One disadvantage of the two beam systems is that the two beams strike the scale at different points and then are recombined to form a single beam. If there are any errors or deviations in the scale at one point but not another, the result of these differences is magnified rather than eliminated, causing an error in the measurement. A further disadvantage is that because there are two input beams striking the scale, there is a likelihood that their path lengths will not be equal prior to and after striking the scale. The system is sensitive to either yaw or tilt variations in scale orientation because a beam splitter is used to creat two input beams and to combine two beams. Errors will thus occur for slight variations in yaw or tilt of the scale. These devices are also susceptible to differences in scale variations along its length, grating groove spacing, and dimensions at different points along the entire length of the scale, a problem specifically solved by the structure of this invention, as described herein. The use of a beam splitter to create and then recombine the two beams creates the potential for more errors. The embodiment of FIG. 8 of the '645 patent still has the problem of two separate angles and is thus sensitive to any variations in scale yaw or tilt, differences in the angle of incidence, or different path lengths. The devices of these two prior art patents thus introduce errors that prevent their use as precision measuring devices.

One shortcoming of the prior art is the assumption that the diffraction efficiency of a beam polarized parallel to the individual grating grooves 20, as shown in FIG. 2b, is identical to the diffraction efficiency of a light beam polarized perpendicular to the diffraction grating grooves 20. Unfortunately, the ratio between the diffraction efficiencies of a beam parallel polarized (p-polarized) or perpendicular polarized (s-polarized) usually varies over the diffraction grating scale 16 surface area due to imperfections in the manufacture of the grating scale 16. Consequently, prior art methods which failed to account for differences in p- and s-polarization diffraction efficiencies based on the polarization of the light are prone to errors in providing the exact position and accurately measuring the displacement as the object moves. Consequently, the prior art device shown in FIG. 1 can only be assumed to be accurate to within 10 nm. If the ratio between the p- and s-polarization diffraction efficiencies varies beyond an expected value due to an imperfection in the scale, the error may be greater than 10 nm.

For the prior art device of FIG. 1, assume that the polarization direction of the linearly polarized input beam 15 is oriented 45° to the grating grooves 20 of the diffraction grating scale 16. The diffraction efficiency for the p-polarization is kp and the diffraction efficiency for the s-polarization is ks. The diffraction efficiencies denote the amplitude efficiencies of the diffracted light with the respective parallel and perpendicular polarizations. Assume further that the polarizers 26 and 28 are oriented with the polarizer 26 perpendicular to the grating grooves and the polarizer 28 parallel to the grating grooves. With these assumptions, the following equations define the amplitude of the light components in the combined beam 34, after being diffracted by the grating a second time at point 24.

$$E_{lp} = B*kp*kp*cos(\omega t + P/2) \quad (5)$$

$$E_{ls} = 0 \quad (6)$$

$$E_{rp} = 0 \quad (7)$$

$$E_{rs} = B*ks*ks*cos(\omega t - P/2) \quad (8)$$

$E_{lp}$ and $E_{ls}$ are the vector components of the beam 32 after being diffracted at 24 $E_{lp}$ being the parallel polarized component and $E_{ls}$ being the perpendicular polarized component $E_{rp}$ and $E_{rs}$ are the vector components of the beam 30 after being diffracted at 24, $E_{rp}$ being the parallel component and $E_{rs}$ being the perpendicular component. ($E_r$ refers to the right-hand beam 30 in all the figures, for ease in terminology; it is the positive angle diffraction beam. Similarly $E_l$ refers to the left-hand beam 32, which is the negative angle diffraction beam.) As previously stated, the polarizer 26 filters out light parallel to the grating grooves in beam 30, and thus $E_{rp}=0$. The polarizer 28 filters light perpendicular to the grating grooves, and thus $E_{ls}=0$ in beam 32. As can be seen from equation 5, the diffraction efficiency kp is multiplied by itself and thus the effect is squared in that portion of the output beam 34. Similarly, the effect of the perpendicular polarization efficiency is squared.

The output beam consists of the combination of the left- and right-hand diffracted beams with their polarization being perpendicular (and thus not interfering), which permits us to describe the components of the output beam as follows:

$$E_{op} = B*kp^2*cos(\omega t + P/2) \quad (9)$$

$$E_{os} = B*ks^2*cos(\omega t - P/2) \quad (10)$$

where $E_{op}$ and $E_{os}$ are the respective vector components of the output beam 34 having p- and s-polarizations. The output beam is then passed through polarizer 52 to obtain the first output signal $I_1$ which is a combination of the two beams as follows:

$$I_1 = C * [kp^4 + ks^4 + 2*kp^2*ks^2*cos(P)] \quad (11)$$

where C is another proportionality factor. The component $E_{op}$ of the second output beam 49 is retarded by 90° by letting it pass through the λ/4 wave delay plate to obtain the second quadrature signal as follows:

$$I_2 = C [kp^4 + ks^4 + 2*kp^2*ks^2*sin(P)] \quad (12)$$

Segmenting $I_1$ and $I_2$ into the DC and amplitude components we obtain the following:

$$DC = C*(kp^4 + ks^4) \quad (13)$$

and $$A = 2*C*kp^2*ks^2 \quad (14)$$

The DC level of the output beam 34 sensed by photodetector 38 is proportional to the sum of the squares of $E_{op}$ and $E_{os}$ as given by equations 9 and 10 to obtain the following:

$$I_3 = D*(kp^4 + ks^4) \quad (15)$$

where D is a proportionality factor. The signal $I_3$ is thus proportional to the average intensity DC level at photodetector 38 and can be used to measure DC. However, $I_3$ is not, in general, proportional to the amplitude A of equation 14. For $I_3$ to be proportional to the amplitude A, the ratio between the diffraction efficiencies for p- and s-polarizations must be constant over the entire diffraction grating scale 16. This, of course, is generally not the case. Thus equations 1 to 15 illustrate the problems of a prior device.

Figure 4A:
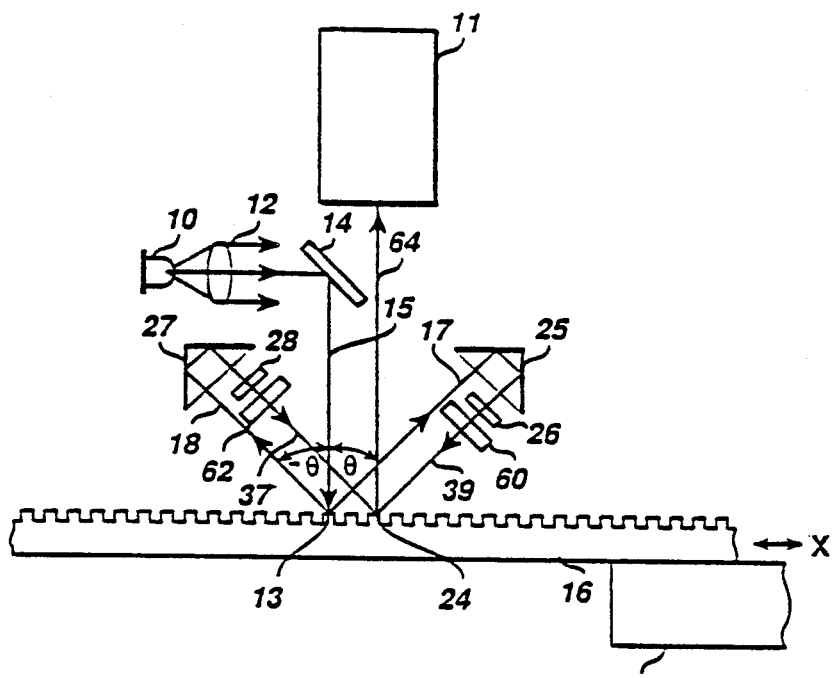
FIG. 4a is a side elevation of a position detection system according to one embodiment of the invention.

FIG. 4a illustrates a displacement detection system operating according to the principles of the invention to overcome the problems of the prior art. According to the principles of the invention, a detection circuit is provided in which the DC value sensed by photodetector 38 is assured of being directly proportional to the amplitude A and thus can always be used for controlling the amplitude A with an automatic gain control system. In addition, the polarization effect of the scale on the diffracted beams is corrected by adjusting the polarization between the first and second times the beams strike the diffraction grating 16 to cancel the effects. The polarization of the two components of the output beam is rotated such that each portion of the beam encounters the same diffraction efficiencies.

As shown in FIG. 4a, the system for compensating for the polarization effects includes λ/2 delay plates 60, 62 positioned in the light beam diffracted from the point 13 prior to striking the grating scale 16 a second time at point 24. (Like elements from the prior art of FIG. 1 have the same reference numbers.) As is known in the prior art, a λ/2 delay plate has the property of producing a mirror image about its fast axis of the state of polarization of the input beam to the plate. (λ/2 delay plates per se and their properties are known in the prior art, and any known prior art λ/2 delay plate is acceptable for use in this invention.) The fast axis of the λ/2 delay plates 60 and 62 is oriented 45° with respect to the polarization direction of the respective polarizers 26 and 28 to turn the polarization direction of the respective output beams 37 and 39 exactly 90°. After having turned the polarization direction of each of the beams 90°, the beams strike the grating scale 16 at point 24 and are diffracted a second time and combined into a single beam 64.

The right-hand beam exiting from the polarizer 26 represents that portion of the beam 17 which has been affected by the perpendicular diffraction efficiencies when first striking the grating scale 16 at point 13. The polarization of this beam is then rotated by delay plate 60 so that it is attenuated by the parallel diffraction efficiencies when it strikes the grating scale 16 a second time as beam 39. Similarly, the left-hand beam exiting from the polarizer 28 has been attenuated by the parallel diffraction efficiency when first striking the scale at point 13, and is rotated to a polarization perpendicular to the diffraction grating grooves 20 prior to striking the grating 16 a second time at 24 as beam 37. Thus, each portion of the beam 64 is attenuated once by the parallel polarization diffraction efficiency and once by the perpendicular polarization diffraction efficiency. Both beams 37 and 39 pass through the same diffraction efficiencies, effectively canceling the relative change in intensity based on differences in diffraction efficiency and ensuring that the ratio between the two beams based on differences of polarization diffraction efficiencies is always equal to 1.

The equations describing the components of output beam 64 following the principals of the invention are as follows:

$$E_{op} = B^* ks^* kp^* \cos(\omega t + P/2) \quad (16)$$

$$E_{os} = B^* kp^* ks^* \cos(\omega t 3^* P/2) \quad (17)$$

As is clear from equations 16 and 17, the effect of the diffraction efficiencies ks and kp are multiplied by each other in both the right-hand and left-hand beams. The value of kp*ks will equal the value of ks*kp. The difference between the prior art device can readily be seen by comparing equation 16 with equation 9. According to equation 9, the parallel diffraction efficiency kp is multiplied by itself to create a factor of $kp^2$, which will cause an error if kp≠ks. Similarly, equation 10 contains a $ks^2$ factor. However, in both equations 16 and 17, kp is multiplied by ks, effectively canceling error rather than squaring it.

The quadrature output signals according to the device of the present invention thus become $$I_1 = C^* [(kp^2 {}^* ks^2) + (ks^2 {}^* kp^2) + 2^* kp^2 {}^* ks^2 {}^* \cos(P)] \quad (18)$$

and $$I_2 = C^* [(ks^2 {}^* kp^2) + (kp^2 {}^* ks^2) + 2^* ks^2 {}^* kp^2 {}^* \sin(P)] \quad (19)$$

By viewing equations 18 and 19 it is evident that with this invention, the amplitude A portion is always proportional to the average intensity DC level, a feature assumed by prior art in equations 2 and 3, but not usually true because of scale imperfections; thus:

$$A = DC = 2^* C^* kp^2 {}^* ks^2 \quad (20)$$

further, the signal $I_3$ becomes $$I_3 = D(kp^2 ks^2 + ks^2 kp^2) = 2^* D^* kp^2 {}^* ks^2 \quad (21)$$

Thus, the signal $I_3$ will be directly proportional not only to the average intensity DC level, but also to the amplitude A, independently of the polarization effect of the diffraction grating 16 The amplitude need not always equal the DC level as indicated by equation 20, rather, it is sufficient if the amplitude is proportional to the DC level. Thus, if one of the polarizers or half-wave delay plates are not perfectly matched in their transmission qualities, the DC level will be proportional to the amplitude rather than equal to the amplitude but may still be used to provide feedback. The DC level can therefore be used for measuring the amplitude A in an automatic gain control system for keeping it a constant value using a feedback loop and amplifier.

Figure 3B:
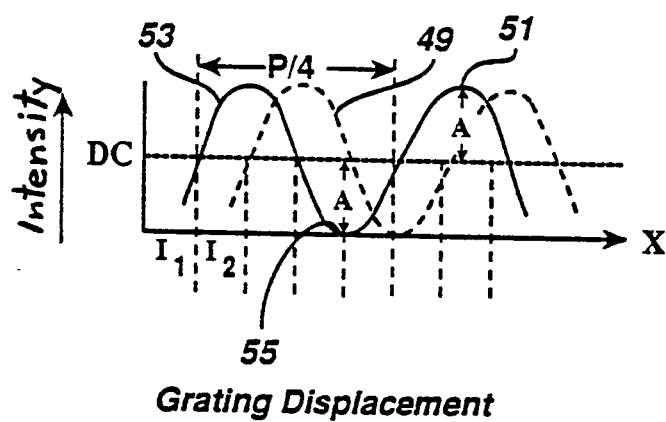
FIG. 3b is a plot of light intensity of two light signals versus grating position, according to one embodiment of the invention.

As illustrated in FIG. 3b, the amplitude A is equal to the average DC level, as shown in equation 20. The average intensity, that is, the DC level, can now be used for measuring the amplitude A in an automatic gain control system to keep the amplitude a constant value.

A feedback loop and amplifier, both well-known circuit elements in the prior art, may be used to ensure that the amplitude A remains a constant value, independent of the polarization effect of the diffraction grating.

As previously stated, when such a feedback was used in the prior art, it unfortunately had the effect of compounding the error because the amplitude A was not directly proportional to the DC level if the diffraction efficiencies were different.

A further advantage of rotating the polarization direction of the beams in between each point where the beams 17 and 18 strike the grating scale 16, as shown with respect to FIG. 4a, is the elimination of errors due to a phase shift that a beam undergoes at each diffraction. At a diffraction, the output beam will be phase delayed relative to the input beam. The phase delays are different for the p- and s-polarized beams. If detection is made according to the prior art, this phase difference $\Delta P$ will add to the phase difference P between the element beams as the grating is displaced. If $\Delta P$ varies over the scale area, which is usually the case because of imperfections in the scale, there will be an error in the measured displacement based on phase changes not caused by scale displacement. By forcing the diffracted beams to be p-polarized at one diffraction and s-polarized at the other diffraction, the phase difference $\Delta P$ is effectively eliminated according to the invention. Therefore, there are no scale displacement errors originating from phase shift caused by the diffractions, a further advantage of the invention over the prior art.

According to principles of the invention, a single beam impinges on the scale, at a single point. The scale itself splits the beam and, upon impinging a second time, combines the beam into the beam for sensing. Use of a single beam, striking a single point, assures uniform scale conditions for each of the two diffracted beams. When the reflected beams strike the scale, they both strike at the same point, once again assuring uniform scale conditions at the critical point. The scale itself is the beam splitting and combining element, by selecting two of the diffractions from the scale. Using a single incident beam and the scale itself as the splitting and combining element is a simple design with much less chance of introducing errors.

Figure 4B:
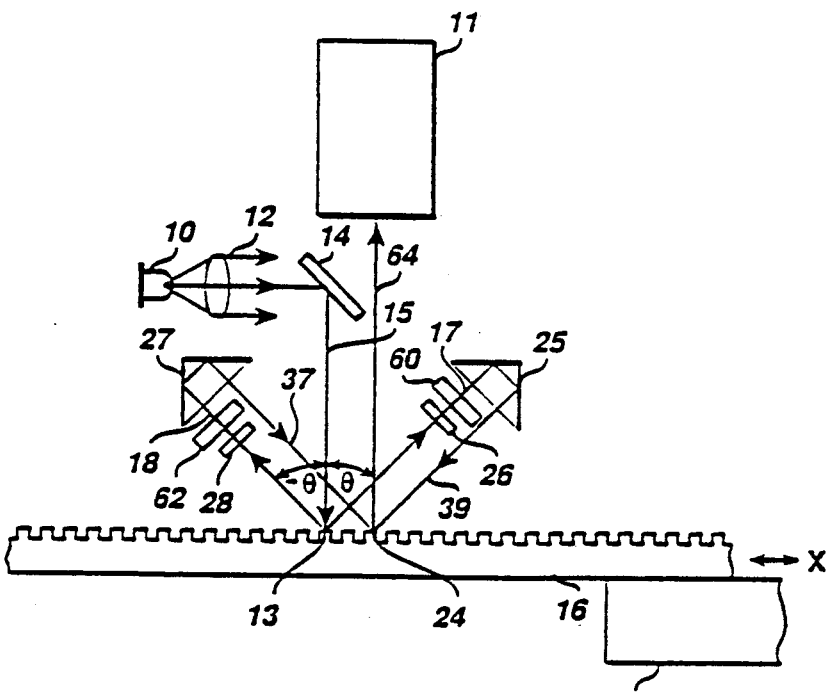
FIGS. 4b–4d are side elevational view of alternative positions for the polarizer and half-wave delay plate.
Figure 4C:
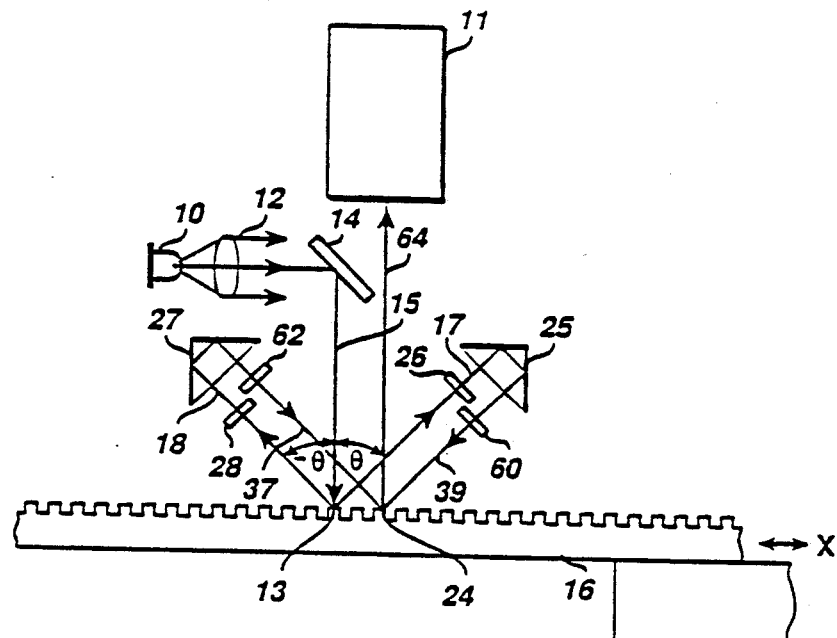
Figure 4D:
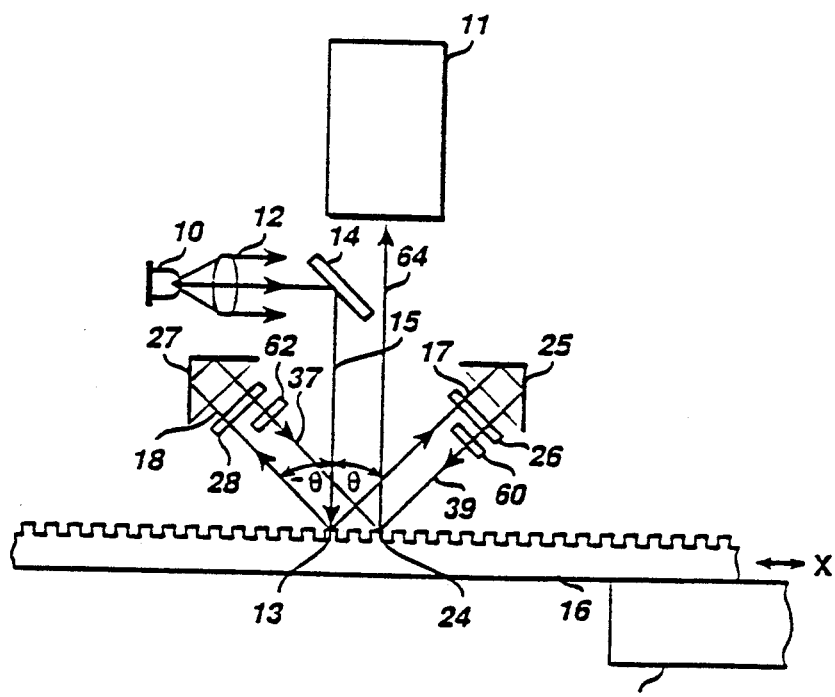

FIGS. 4b–4d illustrate alternative positions for the polarizer 28 and the delay plate 62. As illustrated in FIG. 4a, the preferred position for the polarizer 28 and half-wave delay plate 62 is after the reflector 27, to reduce the effect on the light beam 37 caused by reflector 27. However, in some embodiments, it may be desired to modify the polarization of the light prior to it striking the reflector 27. As illustrated in FIG. 4b, the polarizer 28 and half-wave delay plate 62 are positioned in beam 18, prior to it striking the reflector 27. The polarization of the light beam is modified in the manner that has been explained with respect to FIG. 4a. The light beam 37 then returns to the diffraction grating 16 and is diffracted a second time, according to the principles previously described.

FIG. 4c illustrates the embodiment in which the polarizer 28 is positioned prior to the reflector 27 and the half-wave delay plate is positioned after the reflector 27. The output beam 37 will be modified as previously described with respect to FIG. 4a assuming that the reflector 27 does not modify the polarization of the beam. FIG. 4d illustrates the polarizer 28 extending across both beams 18 and 37, both before and after reflection from reflector 27. The light then enters half-wave delay plate 62 to provide the output beam 37, as previously described. The alternative embodiments of FIGS. 4b–4d may be desired in some circumstances to ensure proper modification of the polarization of the light beam 18 prior to being diffracted a second time.

The order of the polarizers and half-wave plate may be switched if desired. For example, the half-wave delay plate 62 may be positioned in the beam prior to the polarizer 28. The variations shown in FIGS. 4a–4d are also applicable to the delay plate 62. The delay plate may be positioned in the beam prior to the polarizer, either before or after the reflector. A quarter-wave delay plate may be used which spreads both beams 18 and 37 prior to and after reflection, similar to that shown for polarizer 28 of FIG. 4d. The wave will be effectively rotated as by a half-wave delay plate because it passes through a quarter-wave delay plate twice. Other modifications could also be made which fall within the scope of this invention.

One drawback of the system and method described with respect to the prior art at FIG. 1 and the inventive system of FIG. 4a is that significant light is lost as the polarizers 26 and 28 screen light not having the desired polarization.

FIGS. 5 and 6a–6e illustrate a system and method for providing two reflections from the grating 16 in which the polarization effect of the scale grating is canceled and the beams are polarized perpendicular to each other after striking the scale a second time so that they do not interfere in the output beam 68. A $\lambda/2$ delay plate 70 is placed in the path of the left-hand diffracted beam 76. Two $\lambda/2$ delay plates 72 and 74 are placed in series in the path of the right-hand beam prior to its striking the grating 16 a second time. The fast and slow axis of the respective $\lambda/2$ delay plates 70, 72, and 74 are selected to mirror the polarization about a selected axis.

Figure 5:
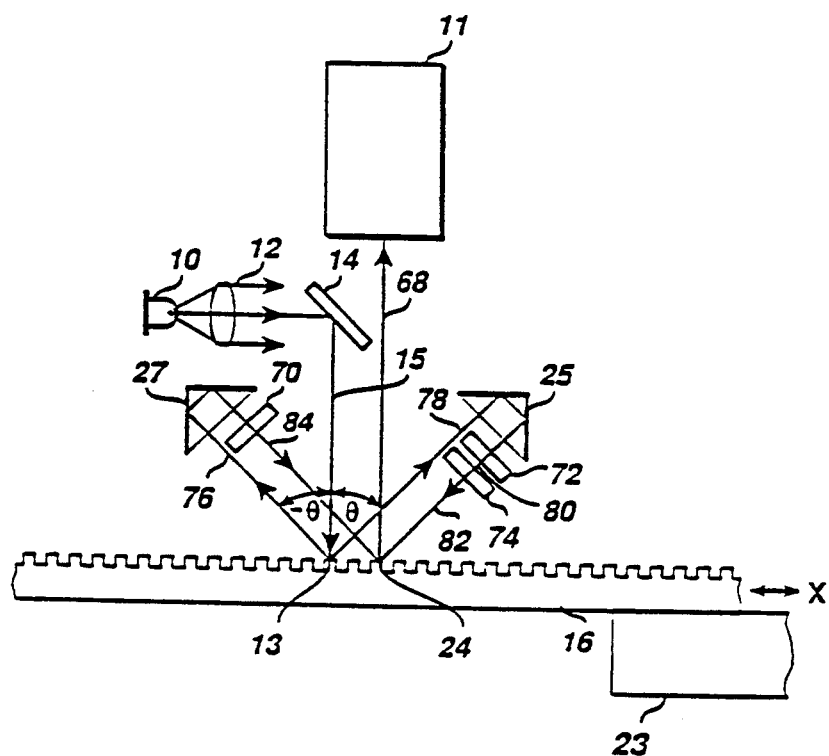
FIG. 5 is a side elevation of a position sensing system according to a second embodiment of the invention.

FIGS. 6a–6e illustrate the beam at different stages in the system of FIG. 5. (The polarization of a light beam is treated as a vector and vector mathematics apply to changes in the polarization.) As previously stated, a $\lambda/2$ delay plate has the effect of producing a mirror image of the polarization of a beam about its fast axis. The polarization of the input beam 15 is denoted by $E_i$ of FIG. 6a having an angle $\beta = 45°$.

As is known in vector mathematics, the polarization vector $E_i$ of the input beam 15 can be divided into the two components $E_{ip}$, which is the component parallel to the grating grooves 20, and $E_{is}$ which is the component perpendicular to the grating grooves 20. When the input beam 15 strikes the diffraction grating 16 at point 13, two diffraction beams are created, a left-hand beam 76 and a right-hand beam 78. As previously stated, the negative angle diffraction beam is referred to as the left-hand beam and the positive angle diffraction beam is referred to as the right-hand beam for ease in understanding and reference. The left-hand beam 76, as shown in FIGS. 5 and 6b, has a polarization vector $E_l$, (for $E_{left-hand}$), and an angle with respect to the parallel direction. $\alpha$ is an arbitrary angle based on the difference in the p- and s-diffraction efficiencies. If the p- and s-diffraction efficiencies are equal, the angle $\alpha$ will be 45°. However, the p- and s-diffraction efficiencies are generally not equal, and thus the angle $\alpha$ is an unknown value and may be greater than or less than 45°. Similarly, the right-hand side of the diffracted beam 78 will have a polarization direction denoted as $E_r$ of the beam 78 at the same angle because both beams impinged upon the grating 16 at the same place and having the same polarization upon striking the grating 16.

The right-hand beam 78 is then reflected by retro-reflector 25 and directed toward the first $\lambda/2$ delay plate 72. As illustrated in FIG. 6c, the $\lambda/2$ delay plate 72 is oriented with its fast axis perpendicular to the diffraction grating grooves 20. The polarization of the beam 78 is therefore mirrored about the perpendicular axis component to rotate the polarization $E_r$ into a mirror image about the perpendicular polarization. The beam 80 exiting from the $\lambda/2$ delay plate 72 has the polarization as illustrated in FIG. 6c. The beam 80 then enters the second $\lambda/2$ delay plate 74. As illustrated in FIG. 6d, fast axis of the $\lambda/2$ delay plate 74 is oriented 45° from the parallel to the grating grooves 20 and thus mirrors the polarization of beam 80 into the polarization of the output wave 82.

A mirror image of the polarization of the left-hand beam is created by orienting the fast axis of the $\lambda/2$ delay plate 70 at 45° from the parallel to the grating grooves 20 to create a mirror image 84 of the beam 76. As shown in FIG. 6d, output wave 84 now has a polarization at an angle $\alpha$ with respect to the perpendicular vector.

The polarization components both parallel and perpendicular to the grating grooves have their amplitudes reversed by the two $\lambda/2$ plates as can be seen by comparing FIG. 6b to FIG. 6d. Thus, when the beams 82 and 84 strike the diffraction grating 16 a second time, the effect of the differences in the s- and p-polarization efficiencies will be canceled. The respective beams 82 and 84 strike the diffraction grating at a second point 24 and are diffracted into new output beam 68. The output beam 68 is the combination of the left and right-hand beam shown in FIG. 6e. The differences in the s- and p-polarization diffraction efficiencies have been canceled, and thus the right-hand component and the left-hand component have an equal magnitude and are polarized 90° from each other. Further, the polarization of the left-hand beam and the right-hand beam are different by 90° and thus they will not interfere when combined into a single beam, a desired characteristic.

All changes in the phases of the output signals are the result of displacement of the diffraction grating 16 as the object 23 moves, rather than errors in the scale, and thus an accurate measure of displacement can be made. Equations 16–21, described with respect to the device of FIG. 4a, may then be used to determine the actual displacement. However, the actual intensity of the signals will be significantly greater because polarizers are not used. The intensity of the respective beams $I_1$, $I_2$, and $I_3$ is more than double the corresponding intensity of the beams when polarizers are used.

A further drawback of prior art devices is that they cannot be used on scales with a pitch smaller than the wavelength of the light source. Presently, laser diodes having a wavelength of approximately 780 nm are used as the light source. The minimum scale pitch which may be used is approximately 1 micron.

Figure 7A:
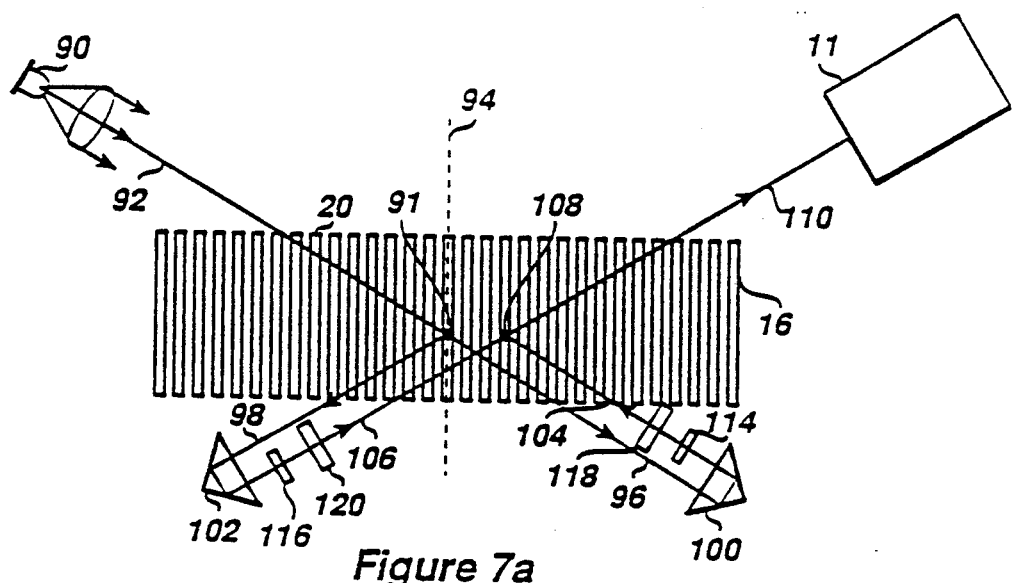
FIG. 7a is a top side view of a further alternative embodiment of the invention.
Figure 7B:
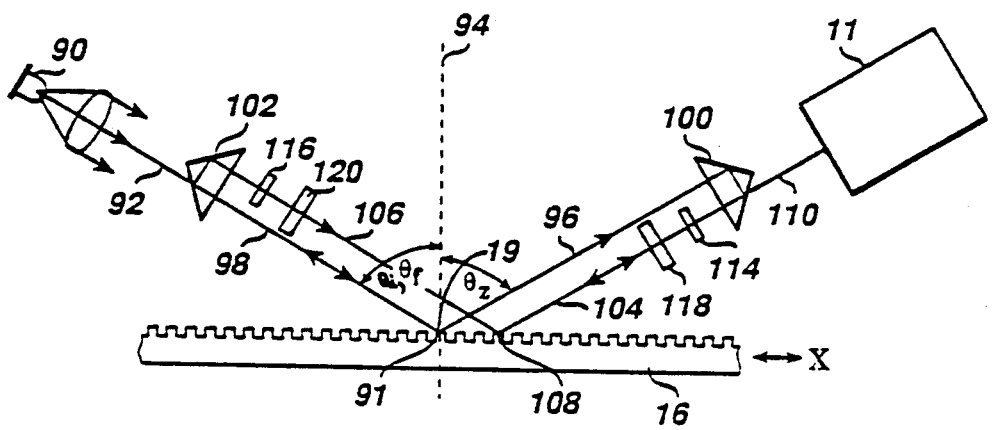

According to an alternative embodiment of the invention, a position sensor has an input beam 92 at an angle $\theta$ with respect to the perpendicular, as illustrated in FIGS. 7a and 7b. (FIG. 7a is the top view of FIG. 7b, and thus illustrates that the light source is horizontally offset from the respective retro-reflectors.) A monochromatic light source 90 projects a collimated beam 92 onto the diffraction grating 16 at an angle $\theta$ with respect to the perpendicular 94 to the surface of the grating 16.

The beam 92 is diffracted into a zeroth order diffraction beam 96 and a first order diffraction beam 98 (right and left beams, respectively). The zeroth order beam 96 and the first order diffraction beam 98 are reflected back to the diffraction grating 16 by retro-reflectors 100 and 102, respectively. The two reflected beams 104 and 106 are parallel to the respective diffracted beams 96 and 98 so that they strike the scale at a point 108 offset from the point 91 at which the input beam struck the scale. At point 108 the diffracted beams are diffracted a second time and joined into a single output beam 110. The output beam 110 is analyzed by the photodetector circuitry 11 of the same type as shown in FIG. 2c. The polarizers 114 and 116 and $\lambda/2$ delay plates 118 and 120 have the same function as previously described with respect to FIG. 4a. An arrangement in which only $\lambda/2$ plates are used as described with respect to FIG. 5 may also be used.

Figure 7C:
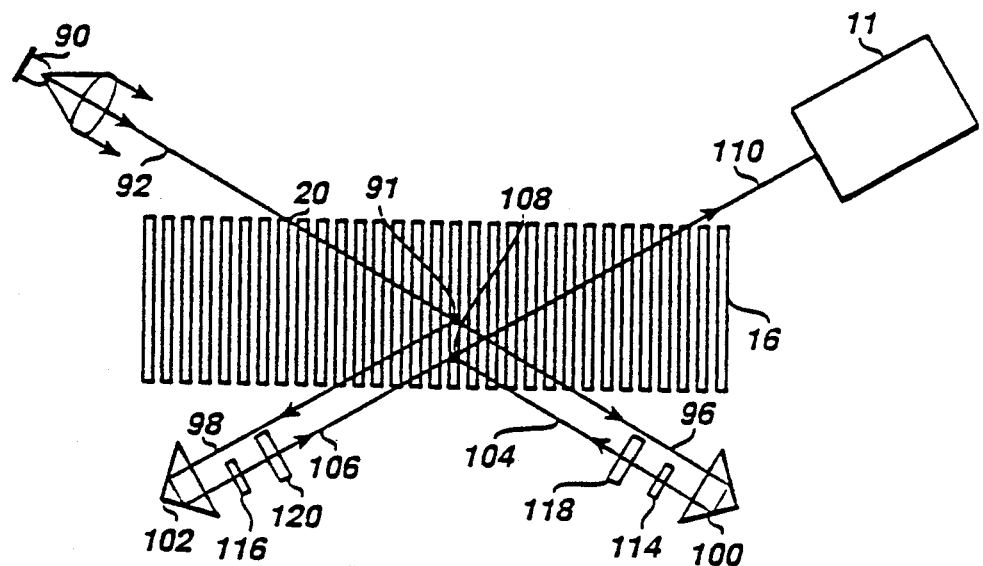
FIG. 7c is a top plan view of a further alternative embodiment of the invention.

The relationship of the impingement point 91 of the input beam to the impingement point 108 of the reflected beam may be selected to provide desired features in reading the scale. As illustrated in FIG. 7a, the input point 91 and output point 108 are spaced from each other perpendicular to the direction of the scale grating grooves 20. (The scale grating grooves 20 are shown significantly enlarged for illustration purposes only to provide a clear view of their direction. In an actual device, the pitch of the individual grating is about 1 micron, and the diameter of the impingement points 91 and 108 will be sufficiently great to cover thousands of grating grooves 20.) The impingement points 91 and 108 must be spaced apart to ensure that they do not overlap. The area covered by the beams may take up significant scale area. FIG. 7c illustrates the same read head as FIG. 7a; however, reflectors 102 and 100 are oriented so that the impingement points 91 and 108 are placed laterally from each other and parallel to the grating grooves 20, rather than along the movement of the scale direction. The configuration of FIG. 7c permits a somewhat longer measurement range for a fixed scale length because of the more narrow beam footprint in the direction of scale movement, but requires a wider scale.

The advantages of having the incident beam 92 at an acute angle can be best understood by examining the principles of physics with respect to light striking a diffraction grating. The angle at which the light is diffracted from the grating is given by the equation:

$$Sin\ \theta_i + Sin\ \theta_0 = n * \lambda/p \qquad (22)$$

where $\theta_i$ is the angle of the incident beam with respect to a plane which is perpendicular to the grating 16 and parallel to the grating grooves 20, $\theta_0$ is the angle of the diffraction beam relative to the same plane, n is the order of the diffraction, $\lambda$ is the wavelength of light, and p is the grating pitch. For a beam whose incidence is normal to the surface, $Sin\ \theta_i = 0$. Equation 22 for a beam normal to the surface becomes, for the first order of diffraction, $Sin\ \theta_0 = \lambda/p$. For a wavelength of light of 0.78 microns and a pitch of 1 micron, the angle $\theta_0 = 51.26°$. For a pitch of 1.5 microns, $\theta_0 = 31°$, but for a pitch of 0.8 microns, $\theta_0 = 77°$, and for a pitch of 0.78 microns, $\theta_0 = 90°$, a difficult position to place the reflectors and sensors. If the pitch becomes less than 0.78 microns, $Sin\ \theta_0$ must become greater than one, an impossibility, and the first order diffraction essentially disappears. For this reason, the pitch must remain somewhat greater than the wavelength of incident light to ensure an adequate diffraction angle if the incident beam is normal to the surface.

An advantage in using a small pitch is that scale linearity is significantly improved. When manufacturing a scale, one is often less concerned about the full scale accuracy than one is about the scale pattern linearity. The reason for being concerned about the scale pattern linearity is that an erroneous scale factor can be corrected fairly easily in the electronics by a multiplication of each reading by a single calibration factor; however, a linearity error requires an individual calibration value for each scale point, the calibration factor being difficult to determine. The holographic method of manufacturing scales is capable of yielding scales with a high degree of linearity. The linearity depends mainly on the surface quality of the mirrors Imperfections in the mirror surfaces distort the wave fronts from being perfectly flat. A deviation d in a wave front results in an error e as follows:

$$e = (d/\lambda g) * p$$

where $\lambda g$ is the wavelength of the light source which is used to generate the scale, and p is the scale pitch. From this equation, it can be seen that the linearity error is directly proportional to the scale pitch. The smaller the scale pitch, the smaller the linearity error for holographically manufactured scales.

The advantage of the read head of FIGS. 7a–7c can be seen again by examining the basic diffraction equations.

$$Sin\ \theta_i + Sin\ \theta_0 = n * \lambda/p$$

where n is the order of diffraction of the diffracted light. $\theta_i$ is the angle of incident light, and $\theta_0$ is the angle of diffracted light. If $\theta_i$ is set equal to $\theta_0$ (rather than equal to zero), then the equation becomes:

$$Sin\ \theta_0 + Sin\ \theta_0 = n * \lambda/p;$$

or $2\ Sin\ \theta_0 = n * \lambda/p;$
which yields $$Sin\ \theta_0 = n * \lambda/2p.$$

The pitch can therefore be made twice as small as was possible in the prior art, and still achieve the same diffraction angle $\theta_0$ for a given wavelength of light. Setting the angle $\theta_i$ of the input beam 92 to be equal to the angle $\theta_0$ of the first order diffracted beam 98 also ensures that there will be no error in the measured scale displacement due to a scale run out in a direction perpendicular to the scale surface 16.

A further advantage of the read head of FIGS. 7a–7c is that the incident beam is not normal to the surface, thereby avoiding the problem with light that is reflected back into the light source 10 of FIG. 1 of the prior art. Back-reflected light generates noise in the laser diode beam, and consequently in the scale output beam. Another advantage is the elimination of the effect of harmful multiple reflections within the read head which otherwise can be a problem in a perfectly symmetrical configuration as in the read head according to the prior art of FIG. 1. Even if the polarizers at the retro-reflectors block the zeroth order beams originating from the second diffraction, that is when the beams coming from the retro-reflectors strike the scale again, the second order diffracted beams generated at that point will retrace the respective beam paths back into the laser diode light source 10, thereby disturbing it. Having the light source 10 at an angle avoids these problems.

With an inclined incident beam, as described above, the resolution of the output signal from the detector is p/2, where p is the scale pitch. For a scale with 0.5 micron pitch the output resolution would be 0.25 micron per output signal period, i.e., the same as for a scale with 1 micron pitch and an input beam of normal incidence. The advantage with the smaller scale pitch is that a better scale linearity can be achieved. If desired, the beam 98 can be selected as the second order diffraction beam instead of the first order diffraction beam. For a given scale pitch one is again able to obtain a resolution of p/4 per output signal period, i.e., the same as for reading the scale with a beam of normal incidence.

Figure 8A:
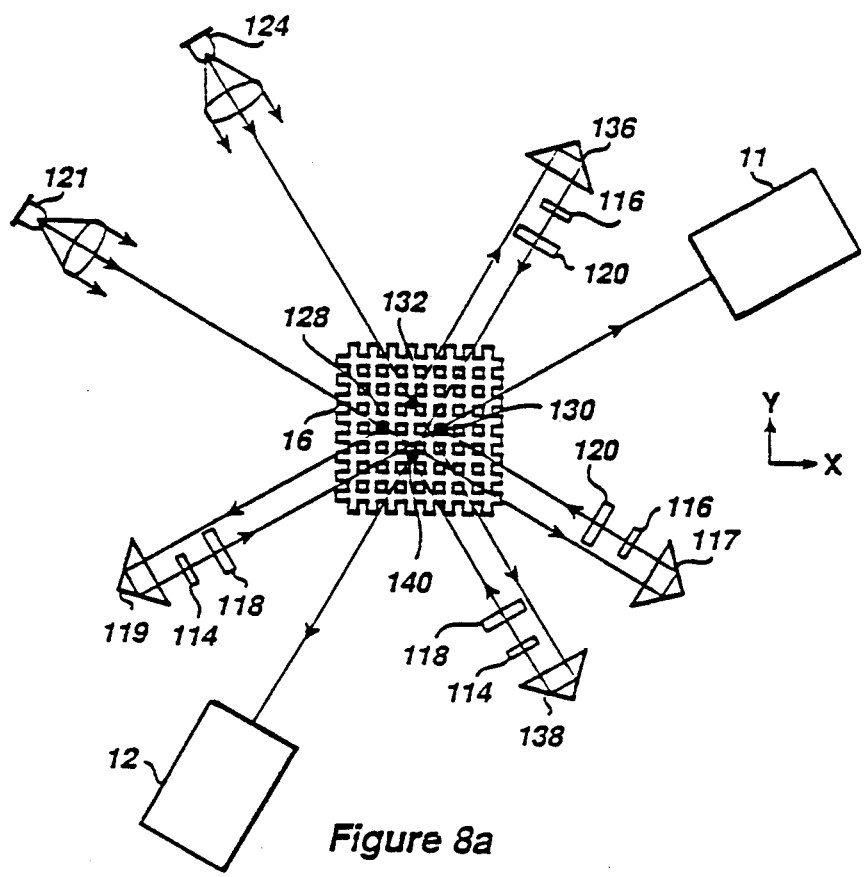
FIG. 8a is a top plan view of an X-Y position detector according to one embodiment of the invention.

The read head principle described with respect to FIGS. 4a-7c is also suitable for a read head used in an x-y displacement measuring device. The principles outlined with respect to FIGS. 7a-7c are illustrated in an x-y encoder in FIGS. 8a and 8b. FIG. 8a is a top plan view of an x-y decoder read head. The read head is basically two separate linear read heads impinging on gratings perpendicular to each other, each grating being perpendicular to the measured direction of displacement. That is, light from light source 121 measures displacements in the x-direction in conjunction with detector 11 and light from source 124 measures displacements in the y-direction in conjunction with photodetector system 12.

Figure 8B:
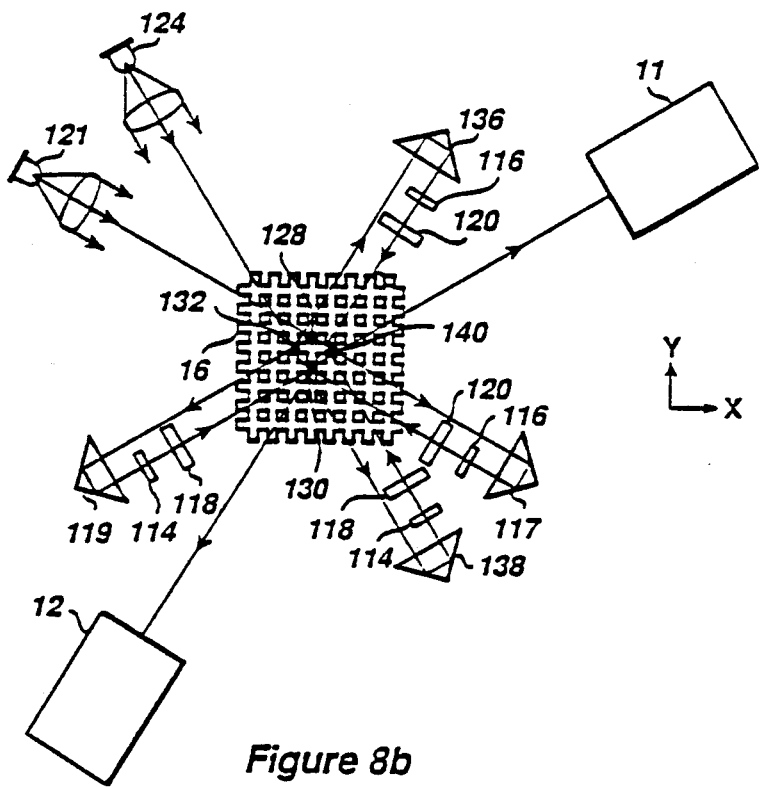
FIG. 8b is a top plan view of an X-Y position detector according to an alternative embodiment of the FIG. 9 is a top plan view of an X-Y position detector according to a further alternative embodiment of the invention.

The same principles previously described with respect to FIGS. 7a-7c are applicable to the embodiments of FIGS. 8a and 8b. Light from source 121 impinges at point 128 and is diffracted into the respective diffraction beams and reflected back to point 130 by reflectors 117 and 119. It is diffracted a second time and sensed by detector 11, in a manner similar to that which has previously been described. Similarly, light from light source 124 is diffracted at point 132 to retro-reflectors 136 and 138 for reflection to point 140 where the beam is diffracted a second time and sensed by detector 12. The beams pass through appropriate polarizers and λ/2 delay plates as previously described with respect to FIGS. 7a-7c, the same components bearing the same reference numbers.

In the embodiment of FIG. 8a, the relationship between the impingement points 128 and 130 is along the respective direction of the scale movement, the x-beam being spaced laterally in the x-direction along the scale. Similarly, the two impingement points of the y-beam 132 and 140 are spaced laterally along the y-direction of the scale. In the embodiment of FIG. 8b, the light sources 121 and 124 and the retro-reflectors 117, 119, 136, and 138 are oriented to cause the respective impingement points on the scale to be perpendicular to the respective scale direction, similar to that described with respect to FIG. 7c.

Figure 9:
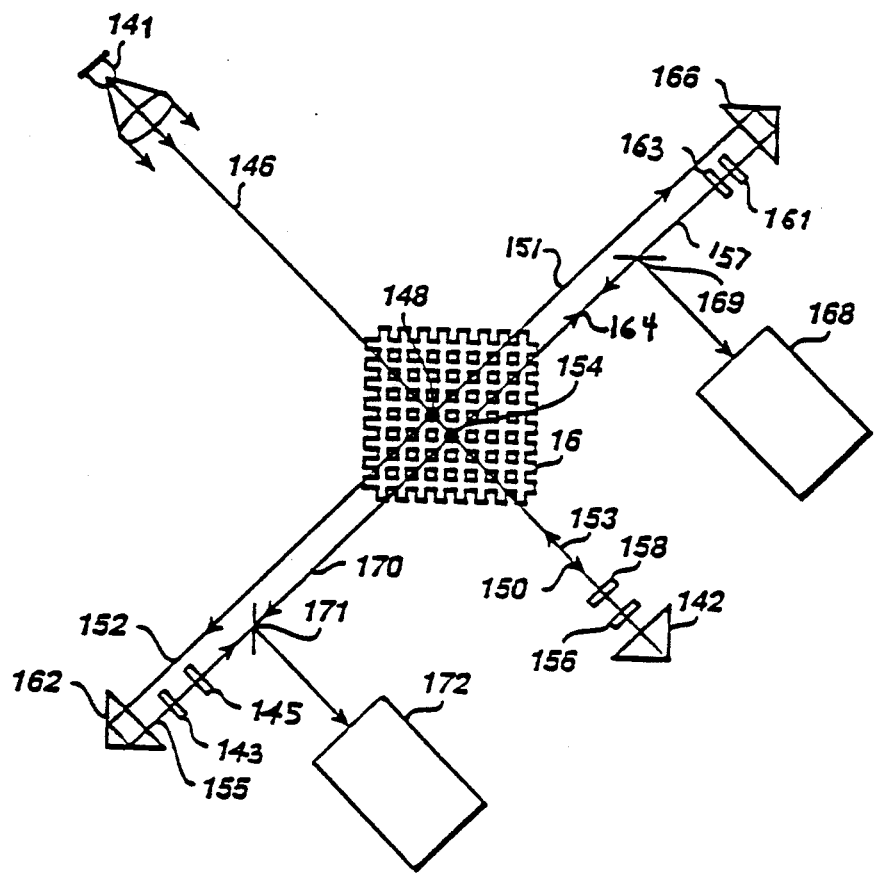

FIG. 9 illustrates a design in which a single light source is used for an x-y displacement sensing device. The previously two separate light sources are merged to a single light source 141 and one retro-reflector 142. The function of the single light source x-y position detector is the same for measurements in both directions and similar to that previously described with respect to FIGS. 4a-8b. The working principle will first be described with respect to displacements in the x direction.

The monochromatic and collimated input beam 146 from laser diode 141 is linearly polarized with its polarization direction at a 45° angle to the p- and s-polarization directions for the gratings on the scale 16. The beam lies within a plane which is perpendicular to the scale and makes a 45° angle to both the x-z and y-z planes. As shown in the coordinate system of FIG. 9, the z-axis is perpendicular to the plane of the paper. The input beam is then symmetrically shared between the x and y measurement directions. The beam 146 is diffracted at point 148 into a zeroth order beam 150 and two first order beams 151 and 152. The zeroth order beam 150 is reflected by retro-reflector 142 to point 154. (In the top plan view of FIG. 9, the beam 150 and the reflected beam 153 appear to coincide, but in fact they are vertically offset from each other by retro-reflector 142 and are separated, as would be apparent in side view.) Reflected beam 153 passes through polarizer 156 and λ/2 delay plate 158 to rotate the polarization direction 90°. At point 154, the beam is diffracted a second time for combining into a beam with the x- and y-diffraction beams for detecting displacement.

Displacement in the x direction is measured using a combined beam 164 from the first order beam 152 as reflected and modified into beam 155 and beam 153. The beam 152 is reflected by retro-reflector 162 to pass through polarizer 143 and λ/2 delay plate 145 to return as beam 155 and impinge upon point 154 for a second diffraction. The zeroth order diffracted beam, reflected back as 153, is combined with the first order diffraction reflected beam 155 into a combined output beam 164, each of the element beams having orthogonal polarization directions so they do not interfere with each other as described with respect to FIG. 4a. The beam 164 is reflected by the half-mirror 169 and is picked up by the x-detector 168 The x-detector 168 is similar to the configuration shown and described with respect to detector 11 of FIG. 1. Linear displacements in the x-direction are thus sensed.

The y-displacements are sensed in a similar manner to the x displacement. The input beam 146 is split into respective diffractive beams 150 and the other first order diffraction 151. The beam 151 is reflected as beam 157, passing through polarizer 161 and halfwave delay plate 163. Beam 157 is diffracted a second time and combined with beam 153 to form an output beam 170 for detection by y-detector 172 to sense displacement in the y-direction. The angle $\theta_i$ (see FIG. 10) between the input beam and the scale is selected as follows:

$$\cos \theta_i = (1/\sqrt{2}) \cdot \lambda/p$$

where λ is the wavelength of the light source and p is the scale pitch. With this choice of $\theta_i$, the angles between the first order diffracted beams and the scale will be equal to $\theta_i$. This aids to eliminate error in the measurement caused by scale runout in a direction perpendicular to the scale's surface. The impingement points 148 and 154 are selected to be diagonally spaced from each other along the square grid pattern of the x and y diffraction gratings If no polarizers are used, as in the embodiment of FIG. 5, the beam intensity as sensed will be equal to that sensed with two light sources.

Figure 10:
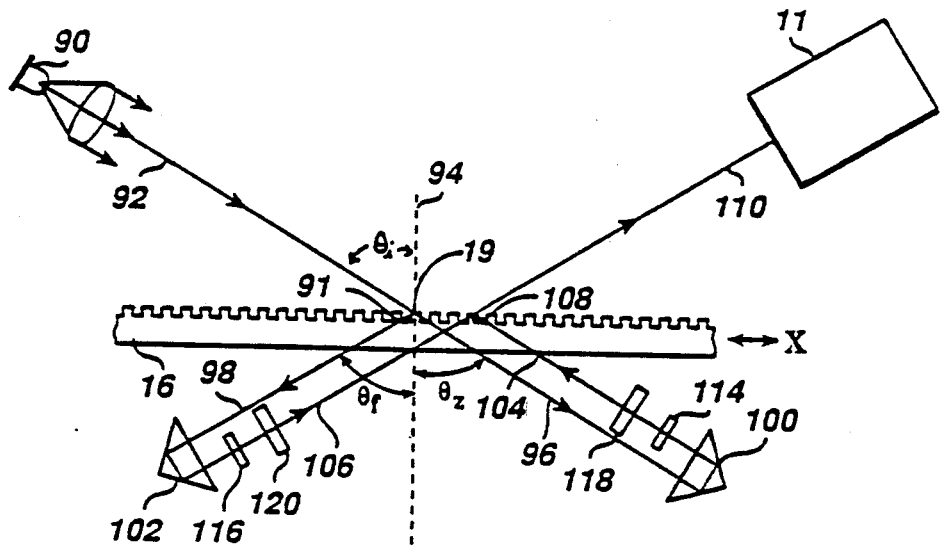
FIG. 10 is a side elevational view of an alternative embodiment of the invention in which the diffraction member 16 is a transmission grating.

FIG. 10 illustrates an apparatus having the principles of the invention similar to those of FIG. 7, in which the diffraction grating 16 is a transmission grating rather than a reflective grating. The use of a transmission grating per se is well known in the art and, given the teachings herein, it would be possible to build the system using a transmission grating rather than a reflection grating for the diffraction member 16. In summary, the light beam 92 impinges upon the diffraction member 16 at an initial angle $\theta_i$. The light is diffracted in a zeroth order beam 96 and a first order beam 98. These beams are transmitted through the scale 16 rather than being reflected. The reflectors, polarizers and half-wave plates are on the opposite side of the diffraction grating 16 from the light source 10 and operate as previously described with respect to FIGS. 4 and 7, common reference numerals being used for similar elements. After the light beams are diffracted a second time, the combined beam is provided to detector 11, as previously described.

Figure 11:
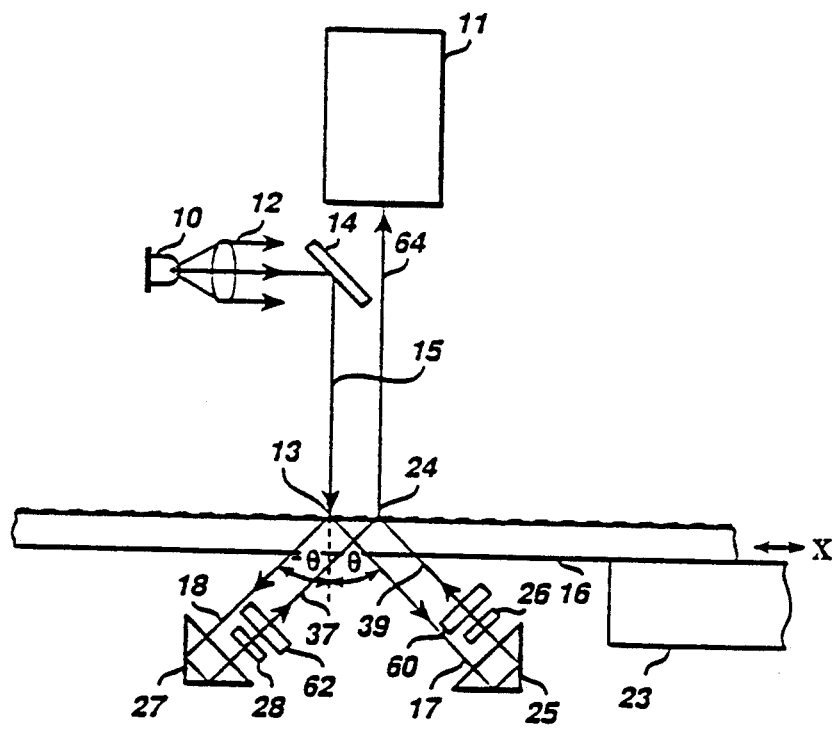
FIG. 11 is a side elevation of an alternative embodiment in which the diffraction member 16 is a transmission plate having a scale pattern thereon.

FIG. 11 illustrates a diffraction member 16 being a transmission member and having a pattern painted or etched on the surface thereof. The operation of the structure of FIG. 11 is similar to that of FIG. 4 except for the use of transmission member 16 and, given the description previously provided herein, will be apparent to those of ordinary skill in the art.

Different diffraction members and grating elements may be used, including any available transmissive or reflective diffraction members. Any suitable diffraction member or grating element may be used of those presently available in the art. The grating may be a surface relief grating, a photo emulsion grating, a thin grating, or a phase grating. For example, surface relief grooves and painted patterns have been shown, but any element which provides a suitable diffraction of light may be used.

The invention has been shown and described with respect to various embodiments. It will be clear that the particular features discussed with respect to FIG. 5 may also be used in the embodiments illustrated in the other figures, according to the principles of the invention. While the principles of the invention have been primarily illustrated by describing linear encoders and sensing linear motion, rotational encoders or sensing of rotational motion may also use the principles of the invention and fall within the scope thereof as encompassed in the claims. Similarly, many variations in the structure or method may fall within the scope of the claims, the scope being limited only by the claims and not the detailed description of particular embodiments.

I claim:

1. A position detector, comprising:
   a diffraction member having a diffraction grating thereon, said diffraction member being coupled to a movable member whose position is being measured;
   a light source adjacent said diffraction member, said light source emitting a first beam of light which impinges at a first selected region upon said diffraction grating and is diffracted by said diffraction grating into a first and second diffracted beams;
   a first reflector means for receiving said first diffracted beam from said diffraction member and reflecting said first diffracted beam back to said diffraction member to impinge at a second selected region upon said diffraction member to be diffracted a second time and combined into a combined beam of twice-diffracted light;
   a first polarization rotation member means positioned in said first diffracted beam's travel path for rotating the polarization of said first beam passing therethrough;
   a second reflector means for receiving said second diffracted beam from said diffraction member and reflecting said second diffracted beam back to said diffraction member to impinge in said second selected region upon said diffraction member to be diffracted a second time and combined into a combined beam of twice-diffracted light;
   a second polarization rotation member means positioned in said second diffracted beam's travel path for rotating the polarization of said second diffracted beam passing therethrough, said first and second polarization rotation member means ensuring that each of the two diffracted beams are subject to the same polarization effects of said scale and are at 90° with respect to each when formed into said combined beam;
   a photodetection means for receiving said combined beams and outputting a signal indicative of the change in phase between the two beams caused by grating displacement; and
   an output means for receiving a signal from said photodetection means and outputting a signal indicative of displacement of said movable member.

2. The movement detector member according to claim 1 wherein the polarization of said first diffracted beam prior to passing through said first polarization rotation member means is perpendicular to the grating elements on said diffraction member and is parallel to said grating elements after passing through said first polarization member, the polarization of said second diffracted beam prior to passing through said second polarization rotation member means is parallel to the grating elements on said diffraction member and is perpendicular to said grating elements after passing through said second polarization rotation member.

3. The position detector according to claim 1 wherein the angle of incidence of said first beam is at a selected acute angle to the surface of said diffraction member, such that said selected acute angle is the same as the angle between said first diffracted beam and the surface of said diffraction member, and the same as the angle between said second diffraction beam and the surface of said diffraction member.

4. The position detector according to claim 1 wherein said incident first beam lies within a plane, which is perpendicular to said diffraction grating, and which is parallel to the diffraction grating elements.

5. The position detector according to claim 1 wherein the direction of polarization of the incident said first beam is oriented so that the components of said incident beam, one parallel and one perpendicular to said diffraction grating elements, have equal intensities.

6. The position detector according to claim 1, further including a first polarizer in said first diffracted beam's path to block light which is in a selected orientation with respect to the grating elements on said diffraction member.

7. The position detector according to claim 6 wherein said first polarizer is positioned in said first diffracted beam's path in series prior to said first polarization rotation member and blocks light which is parallel to said grating elements.

8. The position detector according to claim 6 wherein said first polarizer is positioned in said first diffracted beam's path in series after said first polarization rotation member and blocks light which is perpendicular to said grating elements.

9. The position detector according to claim 1, further including a second polarizer in said second diffracted beam's path to block light which is in a selected orientation with respect to the grating elements on said diffraction member.

10. The position detector according to claim 9 wherein said second polarizer is positioned in said second diffracted beam's path in series prior to said second polarization rotation member and blocks light which is perpendicular to said grating elements.

11. The position detector according to claim 9 wherein said second polarizer is positioned in said second diffracted beam's path in series after said second polarization rotation member and blocks light which is parallel to said grating elements.

12. The position detector according to claim 1 wherein said first selected region and said second selected region are spaced from each other in a direction perpendicular to the direction of movement of said movable member.

13. The position detector according to claim 1 wherein said movable member is displaced along an X-axis and a Y-axis and said diffractive grating includes a diffraction pattern having grating elements perpendicular to each other and said first region and said second region are offset from each other at an angle with respect to each of said grating elements.

14. The position detector according to claim 1, further including a third light polarization rotation member positioned in said first beam's travel path for rotating the polarization of light passing therethrough to create a first diffracted beam having a polarization that is at 90° from the polarization angle of said second diffracted beam after striking the diffraction member a second time.

15. The position detector according to claim 1 wherein said light polarization rotation members are half-wave length delay plates which rotate said polarization by mirroring the polarization of light passing therethrough about a selected axis.

16. The position detector of claim 1 wherein said photodetection means includes two photodetectors, each providing a quadrature output signal of the combined beam to provide the displacement and the direction of displacement of the scale.

17. The position detector of claim 1 wherein said photodetection means includes a photodetector which detects the average intensity of said combined beam.

18. A position detector, comprising:
a diffraction member having a diffraction grating thereon, said diffraction member being coupled to a movable member whose position is being measured;
a light source adjacent said diffraction grating, said light source emitting a first beam of light which impinges upon said diffraction grating at a first selected region and is diffracted from said diffraction grating in a diffracted pattern;
a first reflector means for receiving a positive angle diffraction beam diffracted from said diffraction member at a positive angle and reflecting said positive angle diffraction beam back to said diffraction member to impinge upon said diffraction member at a second selected region to create a twice-diffracted light beam, said positive angle diffraction beam being polarized and having a perpendicular polarization component and a parallel polarization component with respect to said diffraction grating elements;
a first light polarization modification member means positioned in said positive angle beam's travel path to or from said first reflective member, said first light polarization modification member means reversing the polarization direction of either said parallel or perpendicular component of said positive beam's polarization but not affecting the other component of said positive beam's polarization;
a second light polarization modification member means positioned in said positive angle beam's travel path in series with said first light polarization modification member so that light travels in series through said first and second light polarization modification members, said second light polarization modification member means rotating the polarization direction of said parallel component by 90° in one direction and the polarization of said perpendicular component by 90° in the opposite direction such that said parallel component is perpendicular to the diffraction grating elements and said perpendicular component is parallel to the diffraction grating elements when said positive angle beam impinges upon said diffraction grating;
a second reflector means for receiving a negative angle diffraction beam reflected from said diffraction member at a negative angle and reflecting said negative angle diffraction beam back to said diffraction member to impinge upon said diffraction member in said second selected region to combine with said positive angle beam into a combined beam of twice-diffracted light with said positive angle beam, said negative angle diffraction beam being polarized and having a perpendicular polarization component and a parallel polarization component with respect to said diffraction grating elements;
a third light polarization modification member means positioned in said negative angle beam's travel path, said third light polarization modification member means rotating the polarization direction of said parallel component by 90° in one sense and the polarization of said perpendicular component by 90° in the opposite sense, such that the parallel component is perpendicular to the grating elements and the perpendicular component is now parallel to the grating elements when said negative angle beam impinges upon said diffraction grating and the polarization angle between the twice-diffracted positive and negative beams is 90°;
an averaging photodetection means for receiving said combined beam and determining the average intensity thereof;
a photodetection means for detecting the variation of said combined beam as the phase of said positive angle beam and said negative angle beam vary with respect to each other; and
an output means for receiving a signal from said two photodetection means and outputting a signal indicative of displacement of said movable member.

19. An X-Y position detector, comprising:
a diffraction member having two sets of diffraction grating elements, one set of grating elements extending in the X direction and the other set of grating elements extending in the Y direction, the sets having the same pitch and being perpendicular to each other to form a square diffraction pattern, said diffraction member being coupled to a movable member capable of displacement of in the X or Y directions in a single plane;

a pair of light sources adjacent said diffraction member, one light source being an X axis light source and the other light source being a Y axis light source, said respective light sources emitting respective beams impinging upon said diffraction member at respective first X and first Y regions to create X axis positive and negative angle diffraction beams and Y axis positive and negative angle diffraction beams;

two pairs of reflective members, one pair reflecting said X positive and negative diffracted beams back to said diffraction member at a second X region to create a combined beam of X axis light and a second pair reflecting said Y positive and negative angle diffracted beams back to said diffraction member at a second Y region to create a combined beam of Y axis light;

a light polarization modification member positioned in the travel path of each of said diffracted beams for rotating the polarization of said diffracted beams passing therethrough;

a pair of photodetector means for receiving said respective combined X and Y axis light beams and for outputting signals indicative of the changes in strength of said respective X and Y combined beams based on the phase change when said grating is displaced in the X or Y direction; and output means for receiving said signals from said respective photodetector means and outputting the position of said movable member in both an X and Y direction.

20. The X-Y position detector according to claim 19 wherein said first and second X regions are offset from each other along the X axis and said first and second Y regions are offset from each other along the Y axis.

21. The X-Y position detector according to claim 19 wherein said first and second X regions are offset from each other along the Y axis and said first and second Y regions are offset from each other along the X axis.

22. A method of sensing the position of an object having a diffraction grating coupled thereto, comprising:

impinging a light on said diffraction grating at a first selected location to create a positive angle diffracted beam and a negative angle diffracted beam, each of said diffracted beams extending away from said diffraction grating and each having a component which is polarized perpendicular to the direction of the diffraction grating elements and a component which is polarized parallel to the direction of the diffraction grating elements;

reflecting said positive angle and said negative angle beams onto to a second selected location of said diffraction grating;

mirroring the polarization of said positive and negative angle beams about a selected axis prior to their impinging upon said diffraction grating at said second selected location;

diffracting said positive and negative beams a second time on said diffraction grating to create a combined beam of twice-diffracted light;

detecting the relative changes in phase between said positive and negative angle beams as said object moves; and outputting the position of said object based on the relative changes in phase between said positive and negative angle beams.

23. The method according to claim 22, further including the step of:

passing said respective positive and negative angle beams through a polarizer prior to said mirroring step.

24. The method according to claim 22, further including the step of:

passing said respective positive and negative angle beams through a polarizer after said mirroring step.

25. The method according to claim 22, further including a second mirroring step of:

mirroring the polarization of said positive angle beam about a second axis different from said selected axis.

26. The method according to claim 22 wherein said mirroring step is performed by passing said respective beams through half wave delay plates 27. The method according to claim 22 wherein said light impinges on said diffraction grating at an angle to the surface of the grating which is equal to that of the positive diffraction angle to the surface of the grating.

28. The method according to claim 22 wherein said second location is offset from said first location in a direction parallel to said grating elements on said diffraction member.

* * * * *